(12) United States Patent
Butera et al.

(10) Patent No.: US 6,706,387 B2
(45) Date of Patent: *Mar. 16, 2004

(54) EASY HANDLING ULTRACLEAR THERMOPLASTIC FILM

(75) Inventors: Paul Butera, West Warwick, RI (US); Hiro Furuya, Narragansett, RI (US); William Fritz, South Kingstown, RI (US)

(73) Assignee: Toray Plastics (America), Inc., RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/931,473

(22) Filed: Aug. 16, 2001

(65) Prior Publication Data

US 2003/0068510 A1 Apr. 10, 2003

(51) Int. Cl.⁷ .................. B32B 27/06; B32B 27/18; B32B 27/20; B32B 27/36; B32B 27/30
(52) U.S. Cl. .................. 428/327; 428/215; 428/323; 428/328; 428/329; 428/331; 428/336; 428/480; 428/483
(58) Field of Search ................ 428/212, 213, 428/215, 216, 323, 327, 325, 329, 330, 331, 480, 483, 694 ST, 69 SL, 334, 335, 336, 910, 339

(56) References Cited

U.S. PATENT DOCUMENTS

| | | |
|---|---|---|
| 4,092,289 A | 5/1978 | Remmington |
| 4,820,583 A | 4/1989 | Miquel et al. |
| 4,828,918 A | 5/1989 | Miquel et al. |
| 4,829,198 A | 5/1989 | Maley et al. |
| 5,023,291 A | 6/1991 | Sakamoto et al. |
| 5,096,773 A | 3/1992 | Sakamoto |
| 5,387,501 A * | 2/1995 | Yajima et al. ............... 430/533 |
| 5,474,046 A | 12/1995 | Corona |
| 5,480,715 A * | 1/1996 | Mills et al. ................. 428/327 |
| 5,648,159 A * | 7/1997 | Sato ............................ 428/327 |
| 5,656,356 A * | 8/1997 | Masuda et al. ............. 428/141 |
| 5,718,971 A | 2/1998 | Lee et al. |
| 5,880,201 A * | 3/1999 | Enomoto et al. ........... 524/492 |
| 5,958,552 A * | 9/1999 | Fukuda et al. .............. 428/141 |
| 6,043,190 A * | 3/2000 | Ichikawa et al. ............ 503/200 |
| 6,150,035 A * | 11/2000 | DeFife et al. ............... 428/500 |
| 6,174,655 B1 * | 1/2001 | Shirokura et al. .......... 430/496 |
| 6,180,209 B1 | 1/2001 | Sato et al. |
| 6,423,396 B2 * | 7/2002 | Hashimoto .................. 428/141 |

FOREIGN PATENT DOCUMENTS

| | | | |
|---|---|---|---|
| EP | 0 572 224 A1 | | 12/1993 |
| JP | 10-106455 A | * | 4/1998 |
| JP | 2000-117919 A | * | 4/2000 |
| JP | 2000-221688 A | * | 8/2000 |
| JP | 2001-030449 A | * | 2/2001 |
| WO | WO 95/12489 | | 5/1995 |

* cited by examiner

Primary Examiner—Vivian Chen
(74) Attorney, Agent, or Firm—Piper Rudnick LLP

(57) ABSTRACT

Ultra low haze, co-extruded, thermoplastic polymer film prepared by co-extrusion of a blend of polyethyleneterephthalate with organic and inorganic fillers in at least one skin layer on a virtually particle-free polyethyleneterephthalate core layer; the inorganic fillers are aluminum oxide particles and/or silicon oxide of average particle size of about 0.035 $\mu$m to about 0.3 $\mu$m, and wherein particles of the organic filler have a particle size of less than or equal to about 0.8 $\mu$m and are present in an amount less than about 0.04% by weight, based on the weight of the polyethyleneterephthalate, the skin layer being less than about 3 $\mu$m in thickness.

12 Claims, No Drawings

EASY HANDLING ULTRACLEAR THERMOPLASTIC FILM

FIELD OF THE INVENTION

This invention relates to thermoplastic polyester film, particularly to ultralow haze polyethyleneterephthalate film having a wide variety of applications.

BACKGROUND

Polyethyleneterephthalate films are used for a host of converting, printing, coating and metallizing applications. The thermal stability, dimensional stability, chemical resistance and relative high surface energy of polyethyleneterephthalate films are beneficial for typical enduse applications. For instance, polyethyleneterephthalate films are often used as coating bases for magnetic tape, thermal transfer ribbon, packaging materials, thermal lamination and many other web converted products.

Film clarity is often a key requirement for a range of applications of polyethyleneterephthalate films, herein sometimes referred to as "polyester films". Labels, solar control films and other optical applications require films with very high film clarity in order to satisfy enduser expectations. Films with high haze would limit the enduser acceptance of such products. However, many solutions to film clarity requirements render the polyester films difficult to handle and process. Clear polyester films are typically produced by coating or surface treating a plain almost particle free film base. This method produces clear film, but due to the surface treatment the film's chemical resistance and scratch resistance may be compromised rendering it unsuitable for specific applications.

Found within the art are many examples of low haze, easy handling polyester films. However, these prior art materials do not meet the requirements of ultra low haze, herein defined as about ≦0.6% haze. Such low haze numbers are required for highest performance in the optical requirements described above. Furthermore, traditional solutions to low haze polyester film formulations render the film handling properties extremely poor, often leading to converter yield losses and a host of other commercial issues. Therefore, there is a need for a high clarity polyester film with improved handling characteristics.

DESCRIPTION OF THE PRIOR ART

U.S. Pat. No. 6,180,209 describes a biaxially oriented polyester film containing inorganic and organic particle fillers. The particle size distribution of the particles are particularly specified within tight ranges. Our invention advantageously creates a co-extruded film structure with aluminum oxide particles and organic fillers of minimum sizes without the requirements for specific particle size distributions. Such particle size distributions are practically difficult to achieve.

U.S. Pat. No. 5,096,773 describes a biaxially oriented polyester film containing from 0.05 to 3 wt. % of primary aluminum oxide particles of about 5 to 40 nm in size. Furthermore, these primary particles are specified to aggregate to an average particle size of from 50 to 400 nm. Furthermore, this patent teaches the requirement of an F-5 value (force required for 5% extension) in either the machine or transverse direction of not less than about 12.0 kg/mm$^2$. Our invention differs sharply from this prior art in that we achieve a co-extruded structure, and the minimum sizes of aluminum oxide and organic fillers required to produce a high clarity, easy handling film.

U.S. Pat. No. 5,023,291 describes a polyester composition of >80 mol % of ethylene terephthalate units or 2,6-napthalenedicarboxylate units having 40–80 equivalents/10^6 g of terminal carboxyl groups. Further specified are the requirements of from 0.01 to 5% of aluminum oxide particles of 0.005 to 5 μm particle diameter, and also having a melt resistivity of 6E10^6 to 5E10^9 ohm-cm. Our invention uses low particle size aluminum oxide fillers in conjunction with organic particle fillers in a co-extruded film structure without particle requirements of melt resistivity.

U.S. Pat. No. 4,820,583 describes a metallized, composite polyester film with specific requirements for surface roughness. Our invention differentiates in that we have discovered specific particle type, concentration and layer thickness ranges that produce an ultra clear and easy handling polyester film.

U.S. Pat. No. 5,718,971 describes the formulation of a low haze polyester film prepared from alumina particles treated with a silane coupling agent. Our invention differentiates from this patent in avoiding the necessity of using treated alumina particles in order to obtain sufficient polymer wetting.

U.S. Pat. No. 5,475,046 describes the use of alumina particles of specific sizes added to a reactor blend to produce PET chip. This chip, when extruded, cast into sheets and biaxially oriented produces films of haze <2.0% and μs/μd of <0.7/0.6. Our invention sharply distinguishes from this patent in that we utilize much smaller particles and achieve the advantage of lower friction as well.

U.S. Pat. No. 4,828,918 describes a co-extruded film structure with low haze and low surface roughness required for the production of easy handling ultraclear films. Our invention covers the discovery of specific requirements for particle size, concentration and layer thickness necessary to produce easy handling, ultraclear polyester films.

U.S. Pat. No. 4,092,289 describes a monolayer PET film comprising particles of a mixture of pyrogenic alumina and pyrogenic silica. Our invention has specific requirements for particle size, concentration and co-extruded layer thickness necessary to produce easy handling, ultraclear polyester films.

SUMMARY OF THE INVENTION

This invention relates to an ultralow haze thermoplastic polyester film prepared by co-extrusion of a blend of polyethyleneterephthalate with inorganic and organic fillers in at least one skin layer on a virtually particle free polyethyleneterephthalate core layer, wherein the inorganic fillers are selected from the group consisting of aluminum oxide particles, silicon dioxide and mixtures thereof, of average particle size of about 0.035 μm to about 0.3 μm, and wherein particles of the organic filler have a particle size of less than or equal to about 0.8 μm and are present in an amount less than about 0.04% by weight, based on the weight of the polyethyleneterephthalate, the skin layer being less than about 3 μm in thickness.

This invention also relates to a solar control film comprising an ultralow haze thermoplastic polyester film prepared by co-extrusion of a blend of polyethyleneterephthalate with inorganic and organic fillers in at least one skin layer on a virtually particle-free polyethyleneterephthalate core layer, wherein said inorganic fillers are selected from the group consisting of aluminum oxide particles, silicon dioxide and mixtures thereof of average particle size about 0.035 μm to about 0.3 μm, and wherein particles of the organic filler have a particle size of less than or equal to about 0.8 μm and are present in an amount less than about 0.04% by weight, based on the weight of the polyethyleneterephthalate, the skin layer being less than about 3 μm in thickness.

Further, this invention relates to a label film including a polystyrene acrylate coating laminated with an ultralow haze thermoplastic polyester film prepared by co-extrusion of a layer of a blend of polyethyleneterephthalate with inorganic fillers including aluminum oxide particles of average particle size of between about 0.035 μm and about 0.3 μm, and said inorganic particles including one or more polymers having an average particle sizes of less than about 0.8 and are present in an amount less than about 0.04% by weight, based on the weight of the polyethyleneterephthalate, said co-extruded layer being less than about 3 μm thickness.

DESCRIPTION OF THE INVENTION

This invention is based upon results of exhaustive tests we have conducted. The following disclosure, in describing specific test methods and results, is not intended to define or limit the scope of the invention, which is defined in the appended claims.

Test methods:

Friction was measured with the use of a Testing Machine, Inc. slip tester (TMI-Model #32-06) using ASTM D1894-95. Polyester film samples were cut to specified sizes. One sheet of polyester was clamped, "A" surface up, onto a 18" MD (machine direction)×6" TD (transverse direction) glass plate. Another piece of polyester film was mounted using double-sided tape to a 2.5"×2.5"200 g sled, with the "B" surface down. The sled was placed on top of the glass plate and attached to the load sensing device. The sled was then dragged over the film on the glass plate at 6 in/min. The only contact during the testing was polyester film surface "A" rubbing against polyester film surface "B". The measuring distance used to calculate the value of is was 1" and 4" for μd.

Average surface roughness (Ra) was measured using Kosaka Laboratory Limited Model #SE-30AK and #Ay-31. The average value of the data of 10 times measurements was taken as the surface roughness of the film according to the present invention. All measurements were run at 50,000× magnification and in the transverse direction of the film. The length of the measurement was 4 mm and the cut-off value was 0.08 mm.

Haze was measured using Suga Test Instruments Co. Model #HGM-2DP, using the methods of ASTM Standard D1003.

Total luminous transmission, herein referred to as TLT, was measured on a Suga Test Instruments Co. Model #HGM-2DP, using method described in ASTM Standard D1003.

Clarity was measured on a Byk Garner Hazeguard-Plus equipment, using methods described in ASTM Standard D1003.

Cloudiness was assessed by visual inspection as follows: single sheet samples of film were viewed at a distance of approximately 1 ft. In bright sunlight or under intense light at a slight glancing angle, typically less than 15°. Cloudiness is the milkiness or translucence that appears from such a viewer angle. From this assessment a rating system was established for the film samples. A rating value of "poor" (Grade 10) indicates that the sample looks visably cloudy to the viewer. The samples were then further ranked according to the perceived cloudiness.

Laminate layer and main layer thicknesses were determined based on a ratio of extruder outputs.

Average Particle Size Measurement

Organic Particles

The particles were placed on the object stage of an electron microscope without overlapping them as far as possible, and observed at a magnification of 10,000 to 100,000 times using a scanning electron microscope or transmission electron microscope. In the case of a scanning electron microscope, on the surface of a sample, a platinum film of about 200 angstroms was vapor deposited using a sputtering apparatus beforehand. From the screen or photographed image, the areas of at least 200 particles were measured to calculate the equivalent diameters, and from the area equivalent diameters the volumes of the individual particles were calculated. Based on the volumes, the volume average particle diameter was calculated. (U.S. Pat. No. 5,912,074)

Inorganic Particles

A sample slurry was added to solvent (methanol) such that the concentration of the slurry/solvent was adequate to show adequate light transmission. This solution was pipetted into the Honeywell Microtrac X100 machine. The average particle size and distribution was then measured via this machine.

EXAMPLE 1

The unagglomerated alumina particles having a δ-type crystal form and having an average primary particle diameter of 20 nm, a Mohs' hardness of 7.5 are dispersed substantially uniformly in ethylene glycol by a media dispersion method using glass beads having a particle diameter of 50 μm (rotational speed: 3000 rpm, dispersion time: 4 hours), and the ethylene glycol including the alumina particles was polymerized with dimethylterephthalate to make pellets of polyethylene terephthalate. The content of alumina particles in the polyester was 1.5 wt %. (U.S. Pat. No. 5,284,699) During polymerization the alumina particles agglomerated into particles with an average particle size 0.1 μm with a range of about 0.035 μm to about 0.3 μm.

Polyethyleneterephthalate chips having an intrinsic viscosity of 0.62 were melted using a vent type 2-screw extruder, and a water slurry of the polymer particles prepared above (styrene/bisphenol A diglycidyl ether dimethacrylate copolymer particles) was added, to obtain a polyethylene terephthalate containing organic polymer particles. (U.S. Pat. No. 5,912,074) The content of particle (B) in the polyester pellet (B) was 1.0% with an average particle size of 0.8 μm.

Polyethyleneterephthalate chips having an intrinsic viscosity of 0.62 were melted using a vent type 2-screw extruder, and a water slurry of the polymer particles prepared above (styrene/bisphenol A diglycidyl ether dimethacrylate copolymer particles) was added, to obtain a polyethyleneterephthalate containing organic polymer particles. (U.S. Pat. No. 5,912,074) The content of particle (C) in the polyester pellet (C) was 1.0% with an average particle size of 0.5 μm.

Next, 49.2 parts by weight of pellets (A), 0.7 parts by weight of pellets (B), 0.9 parts by weight of pellets (C), and 49.2 parts by weight of pellets (D) which did not substantially include any particles, were mixed. The mixed pellets were extruded using a vent-type two-screw extruder and filtered using high accuracy filters. This melt stream (I) was fed through a rectangular joining zone where it was laminated to a melt stream of polyester (II), which contained substantially no particles. The laminate produced a three layer co-extruded I/II/I structure. The resulting melt curtain was quenched on a casting drum, and then biaxially oriented via subsequent stretching steps on a roller train and chain driven transverse stretcher. The biaxially oriented film had a total thickness of 23 μm. Both laminate layers (I) were 1.4 μm in thickness.

The resulting film had an exceptionally low haze value of 0.5% and excellent handling and cloudiness properties as shown in Table 1.

EXAMPLES 2 and 3

Film was produced as described in Example 1, except that the pellet content of the laminate layer (I) was varied. As shown in Table 1, the products also had exceptionally low haze of ≦0.6% and excellent handling and cloudiness properties.

EXAMPLES 4, 5 and 6

Film was produced as described in Example 1, except that the pellet content varied, the thickness of both laminate layers (I) were 0.6 μm and the total film thickness was 12 μm. All samples exhibited excellent handling and clarity as shown in Table 1.

COMPARATIVE EXAMPLES 1, 2 and 3

Film was produced as described in Example 1, except that the pellet content and thickness of the laminate layer (I) was varied. As shown in Table 2, while these polyester films exhibited good handling, low haze or good cloudiness, they were deficient in at least one of these properties. Comparative Example 1 exhibited good handling but clarity and cloudiness levels were not adequate. Desired cloudiness levels were at least of a Grade B level and ultra clear film is defined as a haze level of about ≦0.6%. Comparative Example 2 did not handle well or have the required haze requirements. Its static coefficient of friction was in excess of 0.55 and its dynamic coefficient of friction was greater than 0.45. Comparative Example 3 exhibited good clarity but was extremely hard to handle with a μs/μd value of 0.683/0.582.

COMPARATIVE EXAMPLE 4

Calcium carbonate particles having a Mohs' hardness of 3 were dispersed in ethylene glycol by a media dispersion method after adding ammonium phosphate as a dispersant, and the ethylene glycol including the particles of $CaCO_3$ was polymerized with dimethylterephthalate to make pellets (E) of polyethylene terephthalate. The average particle diameter of the $CaCO_3$ was 1.0 μm and the content thereof in the polyester was 3.0 wt. %.

Next, 49.7 parts by weight of pellets (A), 0.5 parts by weight of pellets (E), and 49.8 parts by weight of pellets (D) which did not substantially include any particles, were mixed. The mixed pellets were extruded using a vent-type two-screw extruder and filtered using high accuracy filters. This melt stream (I) was fed through a rectangular joining zone where it was laminated to a melt stream of polyester (II), which contained substantially no particles. The laminate produced a three layer co-extruded I/II/I structure. The resulting melt curtain was quenched on a casting drum, and then biaxially oriented via subsequent stretching steps on a roller train and chain driven transverse stretcher. The biaxially oriented film had a total thickness of 23 μm. Both laminate layers (I) were 1.4 μm in thickness.

As shown in Table 2, while this polyester film exhibited low haze and good cloudiness, its handling characteristics were significantly worse than those of the invention.

COMPARATIVE EXAMPLE 5

Dupont 23 μm Mylar® Type D. Mylar D is an ultra high clarity polyester film used in solar and photo proofing applications. This film consists of a plain polyester substrate, with essentially no particles, that is, surface treated on either one or two sides. While the optical properties of the film were excellent, the film's handling properties were only moderate. Because of inadequate handling, rolls of Mylar D contain knurl impressions to improve winding.

COMPARATIVE EXAMPLES 6a and 6b

12 μm and 23 μm Mitsubishi Hostophan® 5000 series. Hostophan® 5000 series is a clear polyester film used widely throughout the solar control window industry. This film is a mono-layer film that contains both small and moderate size particle additives. The particle distribution and the fact that this film is single layer caused it to have a combination of poor handling, poor cloudiness and moderate haze as shown in Table 3.

COMPARATIVE EXAMPLE 7

23 μm Melinex 453. Melinex 453 polyester film consists of a plain polyester substrate, with essentially no particles, that is, one side adherable coated. This film, while having desirable haze values as shown in Table 3, has less than desirable handling. Another problem with the nature of this film is that slip additives in the coating can migrate out of the film and cause scratching.

TABLE 1

| Example | 1 | 2 | 3 | 4 | 5 | 6 |
|---|---|---|---|---|---|---|
| Laminate (I) | | | | | | |
| Composition (%) | 0.74 | 0.74 | 0.74 | 0.75 | 0.75 | 0.75 |
| Particles (A) 0.1 μm Alumina | 0.0074 | 0.0074 | 0.0074 | 0.0172 | 0.0050 | 0.0100 |
| Particles (B) 0.8 μm Organic | 0.0091 | — | 0.0018 | 0.0211 | 0.0211 | 0.0211 |
| Particles (C) 0.5 μm Organic | — | — | — | — | — | — |
| Particles (E) 0.8 μm $CaCO_3$ | — | — | — | — | — | — |
| Film Thickness (I/II/I) μm | 1.4/ 20.2/ 1.4 | 1.4/ 20.2/ 1.4 | 1.4/ 20.2/ 1.4 | 0.6/ 10.7/ 0.6 | 0.6/ 10.7/ 0.6 | 0.6/ 10.7/ 0.6 |
| Friction | | | | | | |
| μs | 0.536 | 0.512 | 0.518 | 0.420 | 0.490 | 0.478 |
| μd | 0.415 | 0.433 | 0.431 | 0.345 | 0.390 | 0.383 |
| Ra(nm) | 5.0 | — | — | — | 7.0 | — |
| Haze | 0.5 | 0.3 | 0.3 | 0.6 | 0.4 | 0.5 |
| TLT | 89.1 | 89.8 | 89.7 | 89.4 | 89.1 | 89.5 |
| Clarity | 99.8 | 99.8 | 99.8 | 99.7 | 99.7 | 99.8 |
| Cloudiness | 2 | 2 | 2 | 3 | 2 | 2 |

TABLE 2

| Example | Comp 1 | Comp 2 | Comp 3 | Comp 4 | Comp 5 |
|---|---|---|---|---|---|
| Laminate (I) | | | | | |
| Composition (%) | 0.74 | 1.49 | 0.75 | 0.75 | |
| Particles (A) 0.1 μm Alumina | 0.140 | 0.0074 | — | — | |
| Particles (B) 0.8 μm Organic | — | — | — | — | |
| Particles (C) 0.5 μm Organic | — | — | — | 0.015 | |
| Particles (E) 0.8 μm CaCO$_3$ | — | — | — | — | |
| Film Thickness (I/II/I) μm | 1.4/ 20.2/ 1.4 | 1.4/ 20.2/ 1.4 | 1.5/20/ 1.5 | 1.4/ 20.2/ 1.4 | Total 23 μm |
| Friction | | | | | |
| μs | 0.420 | 0.593 | 0.683 | 0.639 | 0.647 |
| μd | 0.345 | 0.474 | 0.582 | 0.526 | 0.523 |
| Ra (nm) | — | — | — | — | 2.5 |
| Haze | 0.7 | 0.6 | 0.1 | 0.2 | 0.2 |
| TLT | 89.6 | 89.2 | 89.6 | 89.6 | 87.5 |
| Clarity | 99.7 | 99.8 | 100 | 99.8 | 100 |
| Cloudiness | 5 | 4 | 1 | 3 | 1 |

TABLE 3

| Example | | Comp 6a | Comp 6b | Comp 7 |
|---|---|---|---|---|
| Laminate (I) Composition (%) | | | | |
| Particles (A) | 0.1 μm Alumina | | | |
| Particles (B) | 0.8 μm Organic | | | |
| Particles (C) | 0.5 μm Organic | | | |
| Particles (E) | 0.8 μm CaCO$_3$ | | | |
| Film Thickness (I/II/I) μm | | Total 12 μm | Total 23 μm | Total 23 μm |
| Friction | μs | 1.00 | 0.587 | 0.596 |
| | μd | 0.75 | 0.486 | 0.517 |
| Ra (nm) | | 14.3 | 10.5 | 3.0 |
| Haze | | 1.1 | 1.7 | 0.2 |
| TLT | | 89.1 | 87.4 | 89.5 |
| Clarity | | 99.4 | 99.3 | 100 |
| Cloudiness | | 10 | 10 | 2 |

Clarity and easy handling in polyester film are desirable attributes. Such attributes are useful for use in optically clear products such as solar control films, safety films, labels, graphics and other film uses. However, previous solutions to these issues were either deficient in clarity, film handling properties, or more often both.

In our experience, film handling properties are directly related to the friction properties of the film. A high coefficient of friction tends to lead to difficult converting of the film due to difficulties in unwinding the film and in subsequent re-winding of the film due to the possibility of increased static and the requirements for higher load tensions to pull the film through the typical roller train used in converting processes. High coefficients of friction can also lead to end user roll formation issues such as pimples and high edges. For easy converting of the film it is desired to create a static coefficient of friction of less than or equal to about 0.55 together with a dynamic coefficient of friction of less than or equal to about 0.45.

We claim:

1. An ultralow haze thermoplastic polyester film comprising a virtually particle-free polyethyleneterephthalate core layer and skin layers on each side of the core layer prepared by co-extrusion of a blend of polyethyleneterephthalate with inorganic and organic fillers in the skin layers, wherein said inorganic fillers are selected from the group consisting of aluminum oxide particles, silicon dioxide and mixtures thereof, of particle size of about 0.035 μm to about 0.3 μm and are present in an amount of about 0.4% to about 0.8% by weight, based on the weight of the polyethyleneterephthalate, and wherein particles of said organic filler have a particle size of less than or equal to 0.8 μm and are present in an amount less than 0.04% by weight, based on the weight of the polyethyleneterephthalate, said skin layers being less than 3 μm in thickness and said film having ≦0.6% haze.

2. The film defined in claim 1, wherein the average particle size of the inorganic filler is about 0.1 μm.

3. The film defined in claim 1, wherein the skin layer has a thickness between about 0.6 μm and about 3 μm.

4. The film defined in claim 1, wherein the organic particles have a particle size between about 0.5 μm and about 0.8 μm.

5. A solar control film comprising an ultralow haze thermoplastic polyester film comprising a virtually particle-free polyethyleneterephthalate core layer and skin layers on each side of the core layer prepared by co-extrusion of a blend of polyethylene-terephthalate with inorganic and organic fillers in the skin layers, wherein said inorganic fillers are selected from the group consisting of aluminum oxide particles, silicon dioxide and mixtures thereof, of average particle size about 0.035 μm to about 0.3 μm and are present in an amount of about 0.4% to about 0.8% by weight, based on the weight of the polyethyleneterephthalate, and wherein particles of said organic filler have a particle size of less than or equal to 0.8 μm and are present in an amount less than 0.04% by weight, based on the weight of the polyethyleneterephthalate, said skin layers being less than 3 μm in thickness and said film having 0.6% haze.

6. The film defined in claim 5, wherein the average particle size of the inorganic filler is about 0.1 μm.

7. The film defined in claim 5, wherein the skin layer has a thickness between about 0.6 μm and about 3 μm.

8. The film defined in claim 5, wherein the organic particles have a particle size between about 0.5 μm and about 0.8 μm.

9. A label film comprising a polystyrene acrylate coating laminated with an ultralow haze thermoplastic polyester film comprising a polyethyleneterephthalate core layer and skin layers on each side of the core layer prepared by co-extrusion of a layer of a blend of polyethyleneterephthalate with inorganic fillers in the skin layers comprising aluminum oxide particles of average particle size of between about 0.035 μm and about 0.3 μm present in an amount of about 0.4% to about 0.8% by weight, based on the weight of the polyethyleneterephthalate, and said inorganic particles comprising one or more polymers having an average particle sizes of less than 0.8 μm and are present in an amount less than 0.04% by weight, based on the weight of the polyethylene-terephthalate, said co-extruded layers being less than 3 μm thickness and said film having ≦0.6% haze.

10. The film defined in claim 9, wherein the average particle size of the inorganic filler is about 0.1 μm.

11. The film defined in claim 9, wherein the skin layer has a thickness between about 0.6 μm and about 3 μm.

12. The film defined in claim 9, wherein the organic particles have a particle size between about 0.5 μm and about 0.8 μm.

* * * * *

UNITED STATES PATENT AND TRADEMARK OFFICE
CERTIFICATE OF CORRECTION

PATENT NO. : 6,706,387 B2
DATED : March 16, 2004
INVENTOR(S) : Butera et al.

It is certified that error appears in the above-identified patent and that said Letters Patent is hereby corrected as shown below:

Column 7,
Table 2, Particles (A) at subheading "Comp 1", please change "0.140" to -- 0.014 --.

Signed and Sealed this

Third Day of August, 2004

JON W. DUDAS
*Acting Director of the United States Patent and Trademark Office*